United States Patent [19]

Stuart

[11] Patent Number: 5,335,469

[45] Date of Patent: Aug. 9, 1994

[54] RAFTER TO PLATE CONNECTION

[75] Inventor: Todd W. Stuart, Castro Valley, Calif.

[73] Assignee: Simpson Strong-Tie Company, Inc., San Leandro, Calif.

[21] Appl. No.: 960,002

[22] Filed: Oct. 13, 1992

[51] Int. Cl.⁵ .............................................. E04B 1/36
[52] U.S. Cl. ................................ 52/655.1; 403/232.1; 52/92.2; 52/713; 52/645
[58] Field of Search ..................... 403/232.1; 52/92.1, 52/92.2, 713, 655.1, 648, 640, 641, 645, 702

[56] References Cited

U.S. PATENT DOCUMENTS

| | | | |
|---|---|---|---|
| 1,652,612 | 12/1927 | Daniels . | |
| 1,657,243 | 1/1928 | Daniels . | |
| 2,354,801 | 8/1944 | DeHuff | 20/2 |
| 2,477,163 | 7/1949 | Barnett | 10/94 |
| 3,423,898 | 1/1969 | Tracy et al. | 52/713 |
| 3,749,428 | 7/1973 | Austead | 403/156 |
| 3,967,908 | 7/1976 | Snow et al. | 403/219 |
| 4,410,294 | 10/1983 | Gilb et al. | 403/27 |
| 4,414,785 | 11/1983 | Howell | 52/713 |
| 5,230,198 | 7/1993 | Callies | 403/232.1 |

FOREIGN PATENT DOCUMENTS 1362019  7/1974  United Kingdom ................... 52/641

OTHER PUBLICATIONS

Graphic Guide to Frame Construction, Thallon 1992 cover, title page and pages 124 & 125.
p. 3 Kant Sag catalog (United Stell Products) 1992.

Primary Examiner—Peter M. Cuomo
Assistant Examiner—Darnell M. Boucher
Attorney, Agent, or Firm—James R. Cypher

[57] ABSTRACT

A rafter to plate connection in a wood frame building including wood top plate, and a wood rafter joined by a variable pitch connector including a rafter seat for receiving a portion of the wood rafter, a fixed base member affixed to the outside edge of the wood top plate, first and second side members joined to opposite sides of the wood rafter, an adjustable base member joined to the rafter seat along a bend line and having a lower end in contact with the upper surface of the wood top plate. Fasteners join the fixed base member to the outside edge of the wood top plate, the adjustable base member to the wood top plate and the wood rafter to the side members.

5 Claims, 5 Drawing Sheets

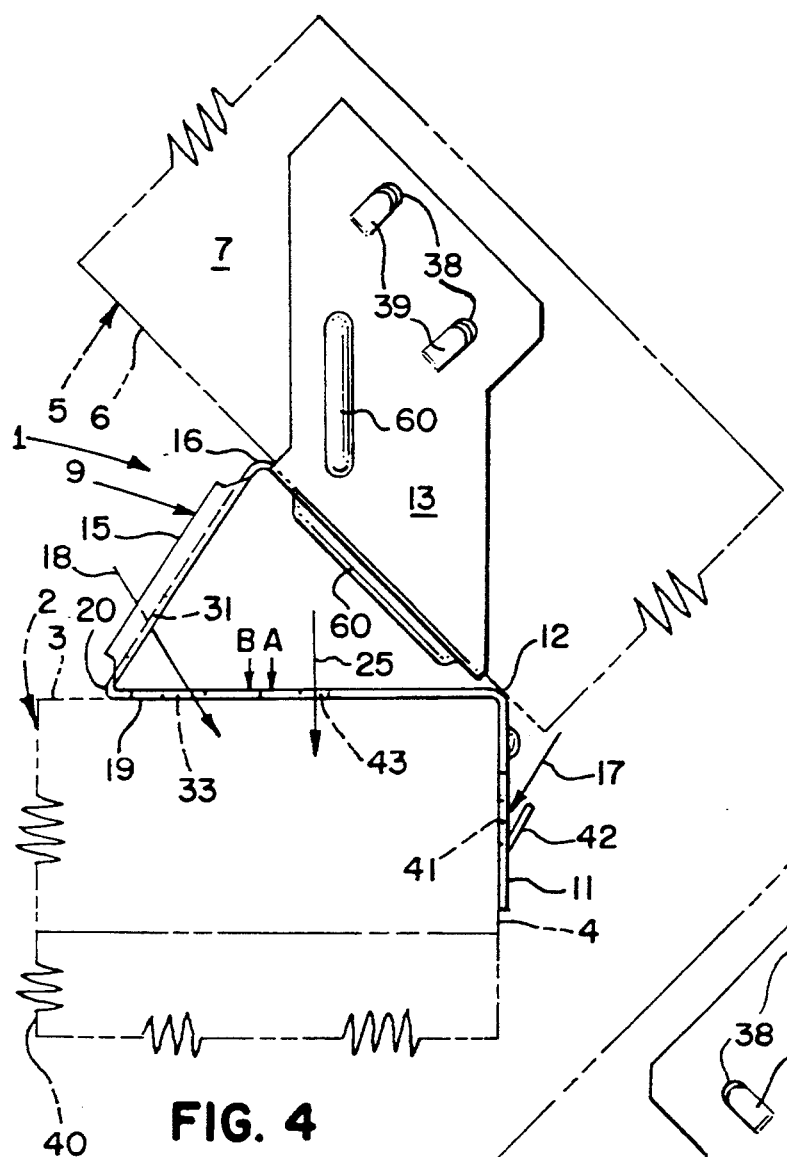
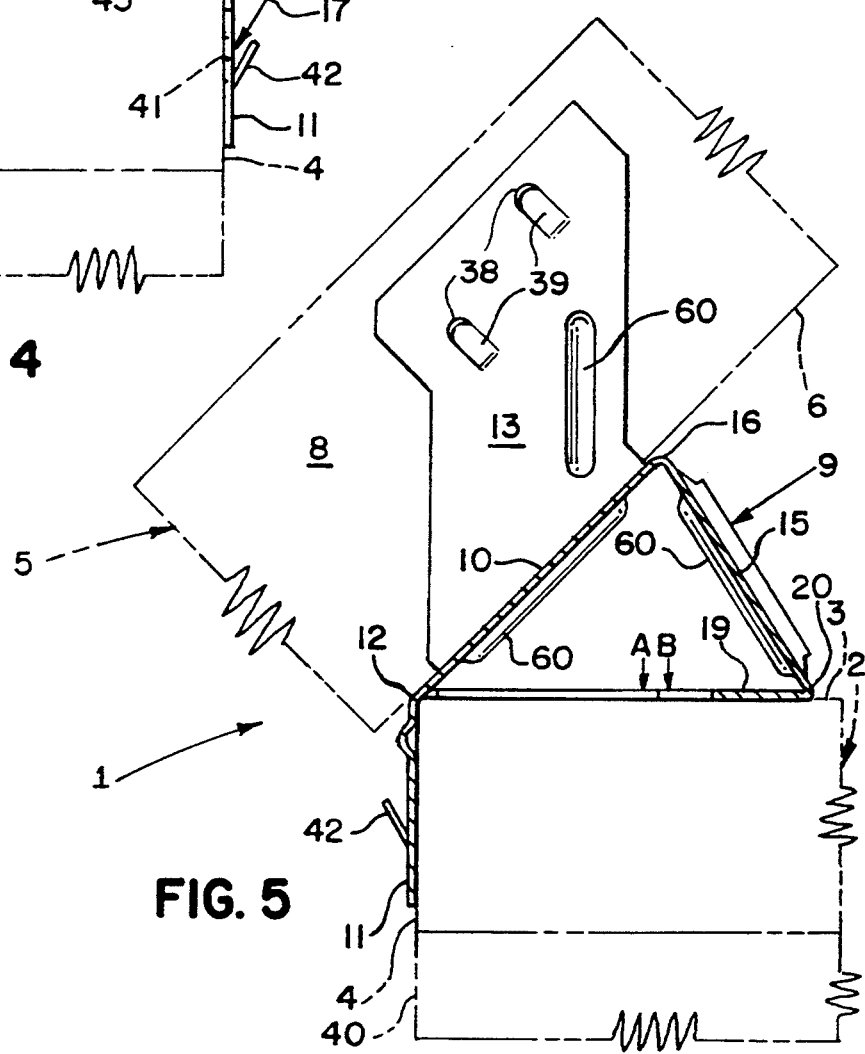
FIG. 4
FIG. 5

RAFTER TO PLATE CONNECTION

BACKGROUND

This invention relates to a rafter to plate connection in wood frame construction.

In wood frame construction, the standard way to attach the lower end of a rafter to a top plate is to cut a "bird-mouth" in the rafter and toe nail the rafter to the top plate. Notching rafters by cutting a "birds mouth" weakens them, however, and requires skillful time consuming sawing. Toe nailing to the top plate provides little uplift resistance caused by hurricanes, typhoons, and earthquakes.

Metal connectors for attaching roof trusses to wood top plates are not new to the industry. Daniels U.S. Pat. No. 1,652,612, 1927 discloses a joist and beam coupling. Daniels does not provide a bearing seat for the bottom edge of the rafter. All the weight of the rafter rests on a pin inserted through a bore hole in the rafter and on the outer edge of the plate. Where roof loads are very high, the pin bearing provided by Daniels is inadequate and would result in splitting of the rafter.

Daniels U.S. Pat. No. 1,657,243, 1928 discloses a rafter bracket with a sloping bearing seat, but there is no adjustability provided for rafters of different slopes. Also, the bracket connects to the inside face of the wood top plate where it would interfere with the installation of gypsum board or joist hangers hung on the inside wall.

Huff, U.S. Pat. No. 2,354,801, 1944, discloses a sloping rafter seat, but provides no adjustability for attaching rafters at different pitches.

Barnett, U.S. Pat. No. 2,477,163, 1949, discloses a truss shoe which does not provide a sloping seat. The rafter must be cut on its bottom edge to fit into the bracket, and the end is cut off to prevent overhang. Tracy, U.S. Pat. No. 3,423,898, 1969, in FIG. 2 discloses a rafter bracket which does not have a sloping seat and must be attached to both the inside and outside of the top plate.

Snow, U.S. Pat. No. 3,967,908, 1976 discloses a bracket which does not have a sloping seat and further requires cutting or notching of the bottom edge of the rafter.

Gilb and Commins, U.S. Pat. No. 4,410,294, 1983 discloses a commercially available adjustable variable pitch connector with a variable sloping seat. The Gilb and Commins connector has two features which limit its use; viz. the connector attaches to the inside of the top plate which may interfere with the wall board or ceiling joist hangers which are attached below or closely adjacent the rafter connector and the connector is limited to a slope between 6/12 and 1/12.

Other commercially available rafter connectors which provide an adjustable sloping seat and are attached to the outside edge of the top plate have the following problems: 1) they are limited to a pitch of 6/12 to 1/12, 2.) provide minimal uplift resistance in the event of hurricanes, tornadoes and earthquakes, 3) they are expensive to make, and 4) require too much material in their construction.

SUMMARY OF THE INVENTION

In the present rafter to plate connection, the variable pitch connector is easily and inexpensively constructed from a minimum of sheet metal and is designed to attach to the top face and to the outer edge of the top plate so that at least four nails driven into the top plate member provide resistance to uplift and at least four nails are driven into the rafter.

A feature of the present invention is the fact that it may be easily field bent to accommodate slopes from 3/12 pitch to 12/12 pitch.

Another feature of the present invention is the fact that the variable pitch connector provides for slant nailing into the rafter to avoid splitting where the rafter is constructed from laminated and glued elements such as engineered wood I-Joists.

Still another feature of the present invention is the fact that it is constructed so as to automatically provide a slope of 12/12, and on a 2×4 top plate, maximum extension automatically provides a slope of 3/12.

BRIEF DESCRIPTION OF THE DRAWINGS

FIG. 4 is a side elevation view of the rafter to plate connection illustrated in FIG. 2 taken along line 4—4. The variable pitch connector is configured to position the rafter at a 12/12 pitch.

FIG. 5 is a cross sectional view taken along line 5—5 in FIG. 3. The variable pitch connector is configured to position the rafter at a 12/12 pitch.

DESCRIPTION OF THE INVENTION

Figure 1:
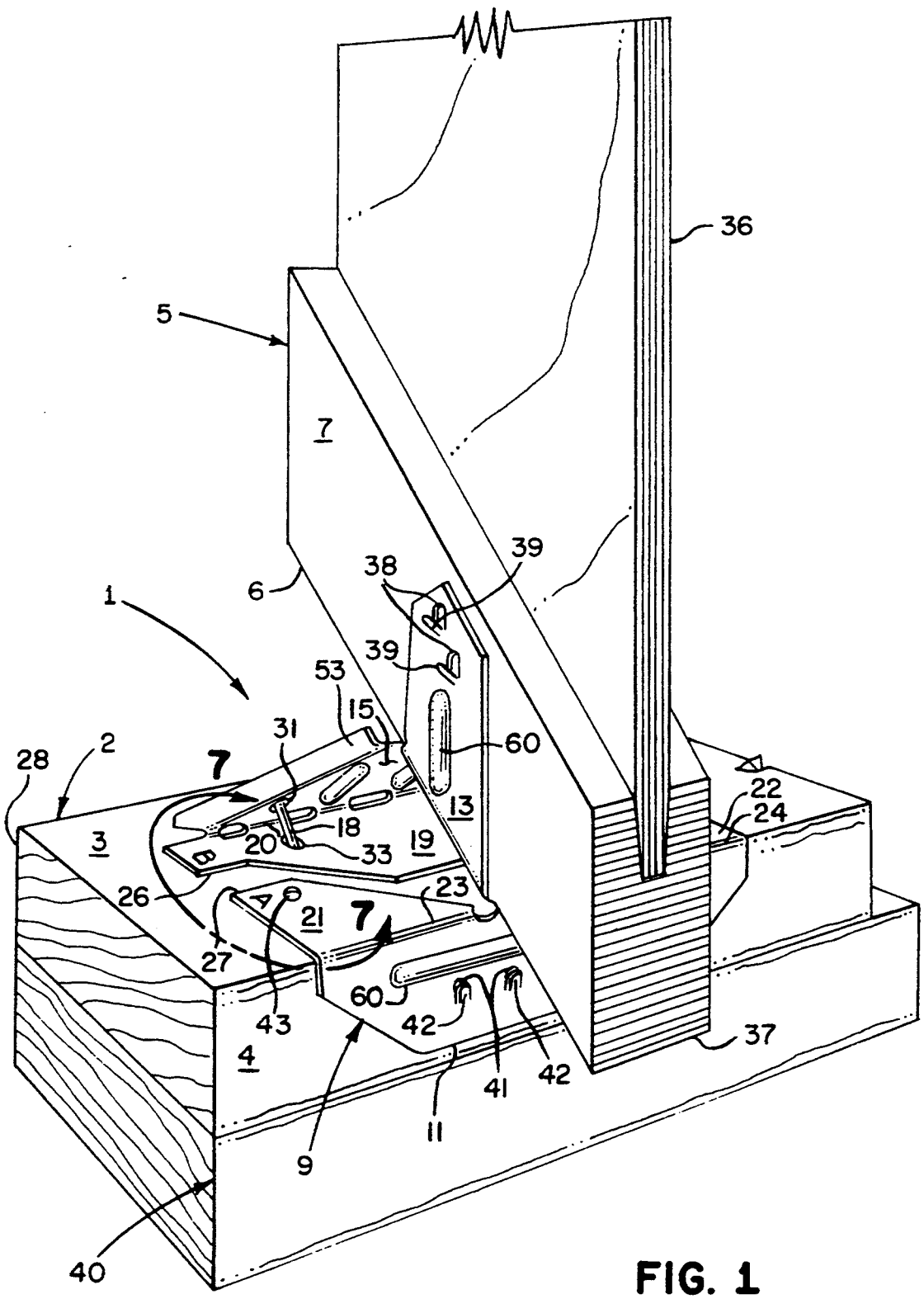
FIG. 1 is a perspective view of the rafter to plate connection of the present invention.

The present invention is a rafter to plate connection 1 including: a wood top plate 2 having an upper surface 3 and an outside edge surface 4, a wood rafter 5 having a bottom surface 6 and first and second side surfaces 7 and 8, a variable pitch connector 9 including: a rafter seat 10 dimensioned to receive a portion of the bottom surface 6 of the wood rafter 5, a fixed base member 11 joined to the rafter seat 10 along a fixed base bend line 12, and first and second side members 13 and 14 joined to the rafter seat 10 and dimensioned for registration with the first and second side surfaces 7 and 8 of the wood rafter 5, an adjustable base member 15 joined to the rafter seat 10 along a rafter seat bend line 16 and having a lower end 20 in contact with the upper surface 3 of the wood top plate 2, plate edge fastener means 17 connecting the fixed base member 11 to the outside edge surface 4 of the wood top plate 2; first top plate fastener means 18 connecting the adjustable base member 15 to the upper surface 3 of the wood top plate 2; and rafter fastener means 35 connecting wood rafter 5 respectively to side members 13 and 14.

A preferred form of the rafter to plate connection 1 as previously described includes: an adjustable base extension member 19 joined to the adjustable base member 15 along the lower end 20; and the first top plate fastener means 18 penetrates the adjustable base extension member 19.

Still another form of the rafter to plate connection 1 as previously described includes: first and second fixed base extension members 21 and 22 joined to the fixed base member 11 along first and second bend lines 23 and 24; and second top plate fastener means 25 connecting the first and second fixed base extension members 21 and 22 to the upper surface 3 of the wood top plate 2.

A feature of the rafter to plate connection 1 as previously described is that the variable pitch connector can automatically indicate when the maximum 12/12 rafter pitch is reached by constructing the rafter to plate connection 1 to include: an adjustable base extension member 19 joined to the adjustable base member 15 along the lower end 20 and formed with an outer facing edge 26; and a first fixed base extension member 21 joined to the fixed base member 11 along bend line 23 first and having an inner facing edge 27 dimensioned and located to register with the outer facing edge 26 of the adjustable base extension member 19 at the selected 12/12 pitch of the wood rafter 5.

Another feature of the present invention is that the rafter to plate connection can be constructed to automatically determine when the minimum pitch 3/12 is reached by constructing the variable pitch connector to include an adjustable base member 15 dimensioned so that the lower end 20 of the adjustable base member 15 is in alignment with inner edge 28 of the wood top plate 2 at the selected minimum pitch of the wood rafter 5.

In still another preferred form the rafter to plate connection 1 includes: a wood top plate 2 having an upper surface 3 and an outside edge surface 4; a wood rafter 5 having a bottom surface 6 and first and second side surfaces 7 and 8; a variable pitch connector 9 including: a rafter seat 10 dimensioned to receive a portion of the bottom surface 6 of the wood rafter 5, a fixed base member 11 joined to the rafter seat 10 along a fixed base bend line 12, first and second side members 13 and 14 joined to the rafter seat 10 and dimensioned for registration with the first and second side surfaces 7 and 8 of the wood rafter 5, an adjustable base member 15 joined to the rafter seat 10 along a rafter seat bend line 16 and having a lower end 20 in contact with the upper surface 3 of the wood top plate 2, an adjustable base extension member 19 formed with a first outer facing edge 26 and a second outer facing edge 30 and joined to the adjustable base member 15 along the lower end 20 wherein the joinder forms a bend line coincident with the lower end 20, and first and second fixed base extension members 21 and 22 joined to the fixed base member 11 along first and second bend lines 23 and 24 and having first and second inner facing edges 27 and 29 located respectively to selectively register with the first and second outer facing edges 26 and 30 of the adjustable base extension member 19 at a selected pitch of the wood rafter 5; plate edge fastener means 17 connecting the fixed base member 11 to the outside edge surface 4 of the wood top plate 2; first top plate fastener means 18 connecting the adjustable base member 15 to the upper surface 3 of the wood top plate 2; second top plate fastener means 25 connecting the first and second fixed base extension members 21 and 22 to the upper surface 3 of the wood top plate 2; rafter fastener means 35 connecting wood rafter 5 respectively to the first and second side members 13 and 14; and the variable pitch connector 9 being field bendable along bend line 12 and the bend line coincident with the lower end 20 of the adjustable base member 15 for infinite slope adjustment of the rafter 5 between selected slope pitches between about 3 in 12 and 12 in 12 pitch.

In another form of the rafter to plate connection previously described, the adjustable base member 15 is formed with laterally displaced slotted openings 31 and 32, the adjustable base extension member 19 is formed with slotted openings 33 and 34 for registration with the laterally displaced slotted openings 31 and 32 in the adjustable base member 15 for all selected slope pitches of the wood rafter and the first top plate fastener means 18 are driven respectively through the laterally displaced slotted openings 31 and 32 in the adjustable base member 15, through the slotted openings 33 and 34 in the adjustable base extension member 19 and into the upper surface 3 of the wood top plate member 2 at an angle to the upper surface 3.

Figures 2, 3:
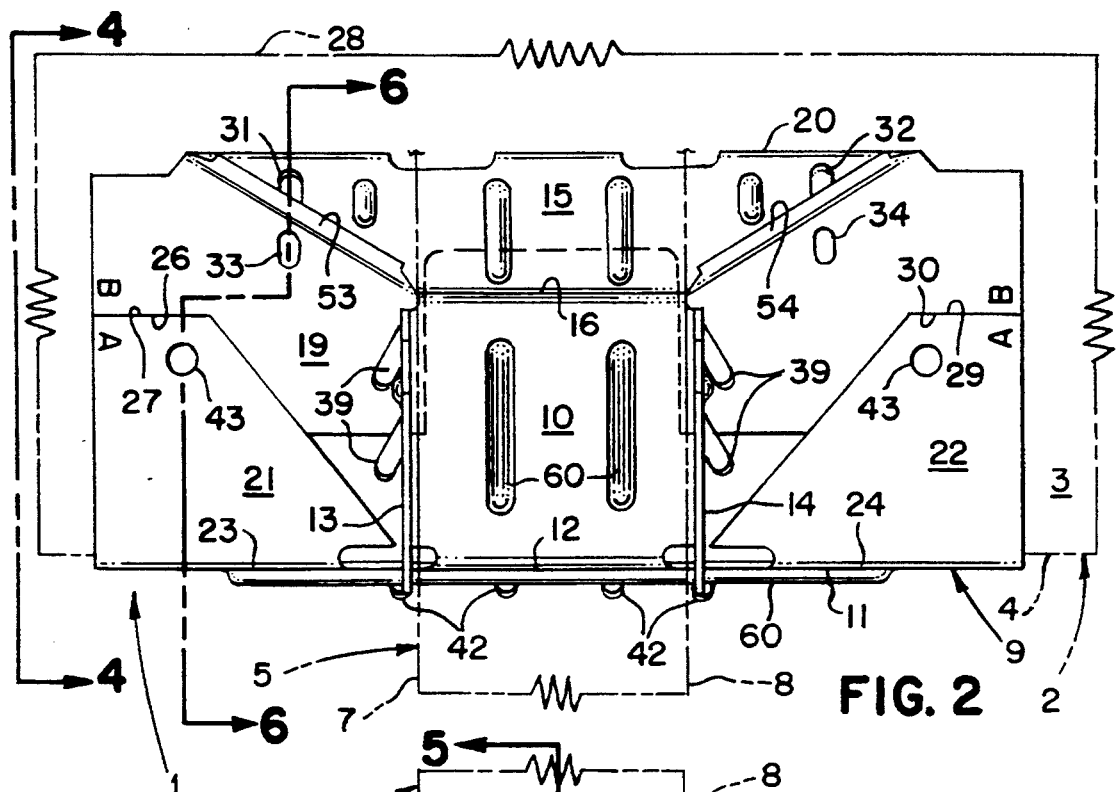
FIG. 2 is a top plan view of the rafter to plate connection illustrated in FIG. 1 with the rafter in broken line to more fully illustrate the variable seat connector.
FIG. 3 is a front elevation view of the rafter to plate connection illustrated in FIG. 1 with the rafter in broken line to more fully illustrate the variable seat connector.

As illustrated in FIG. 1, the wood rafter 5 is formed with a web member 36 which is made from a plurality of plies of wood laminated together, and the lower chord 37 is also constructed from several plies of wood laminated together. In order to avoid splitting of the laminated lower chord 37, rafter fastener means 35 should be driven as illustrated in FIG. 3 at an angle through slotted openings 38 formed in side members 13 and 14. To aid in guiding and insuring the proper angle of slant, the openings may be formed with guide tabs 39.

Figure 6:
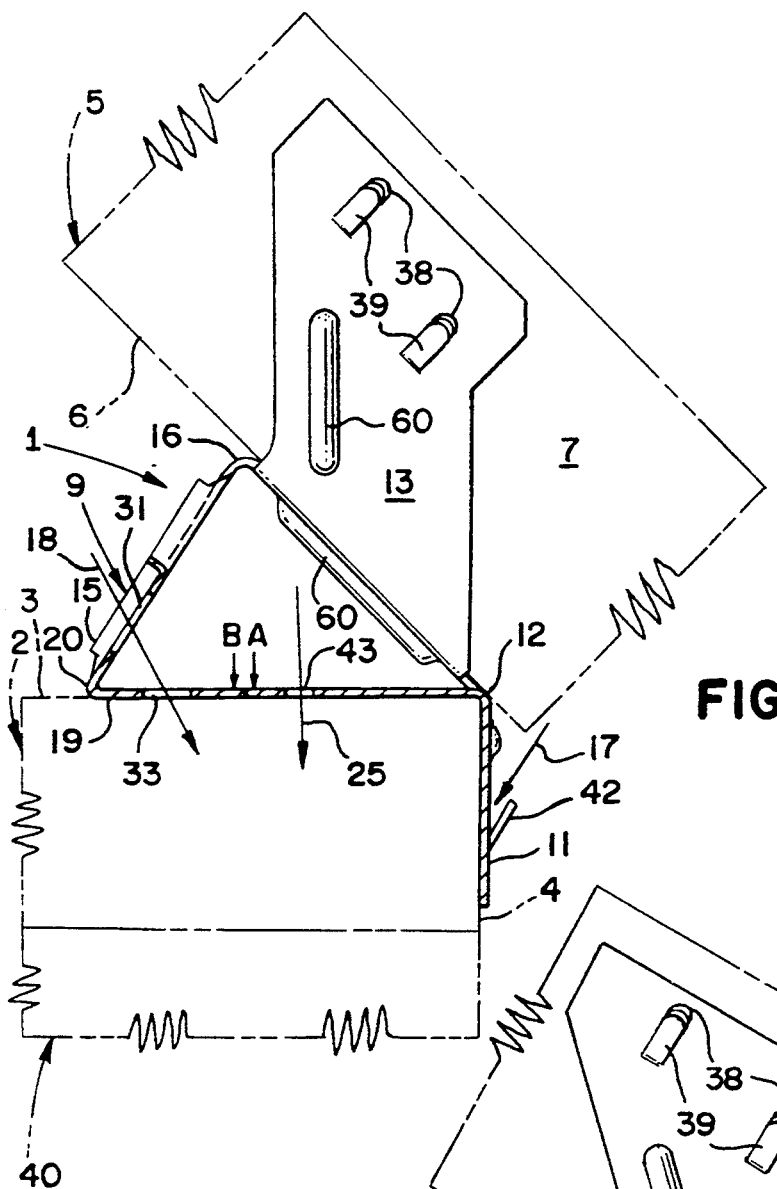
FIG. 6 is a cross sectional view of the rafter to plate connection illustrated in FIG. 2 taken along line 6—6. The variable pitch connector is configured to position the rafter at a 12/12 pitch.
Figure 6A:
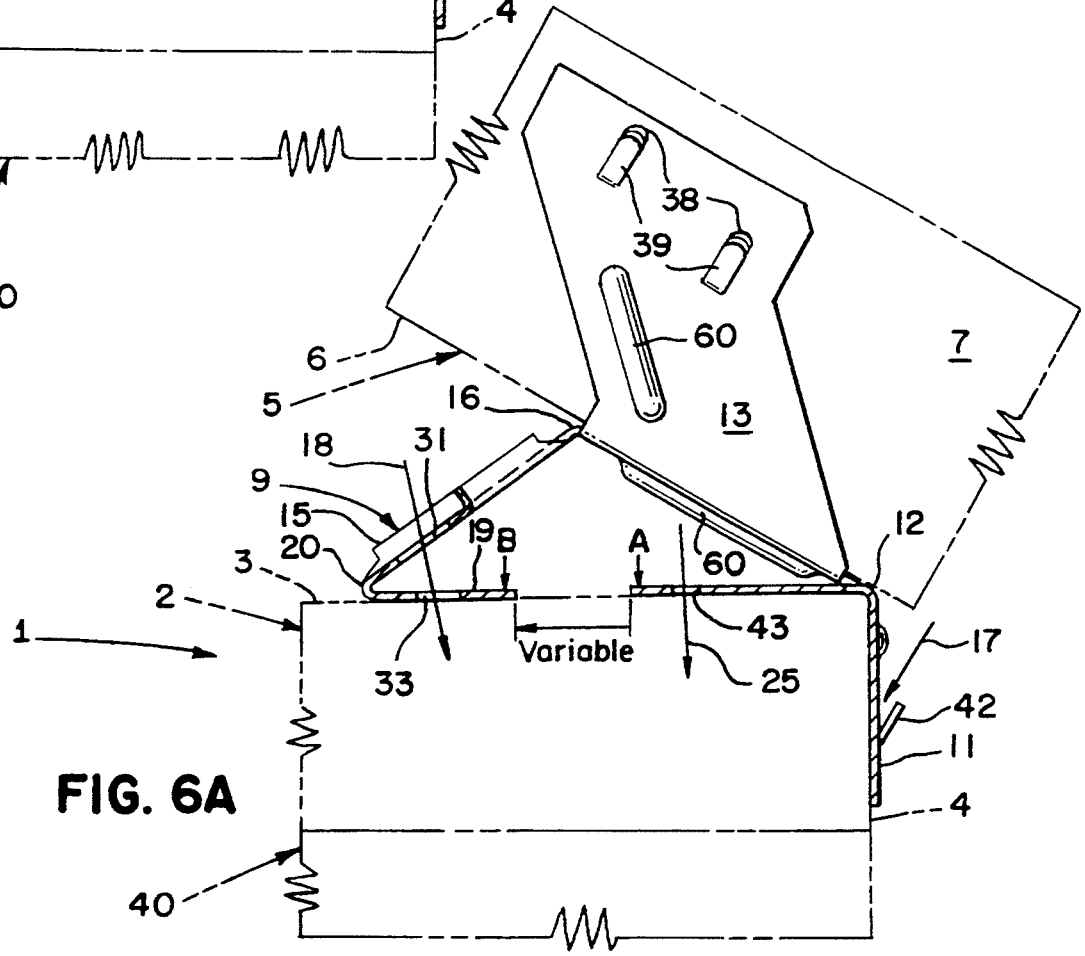
FIG. 6A is a cross sectional view of the rafter to plate connection illustrated in FIG. 2 taken along line 6—6 at a 6/12 pitch.

In attaching plate edge fastener means 17 to wood top plate 2 as well as to a wood bottom plate 40, slotted openings 41 and guide tabs 42 may be formed in fixed base member 11 so that plate edge fastener means 17 may be driven at an angle as illustrated in FIGS. 4, 6, and 6A.

Preferably, fastener openings 43 are formed in first and second fixed base extension members 21 and 22 to receive second top plate fastener means 25.

Figure 8:
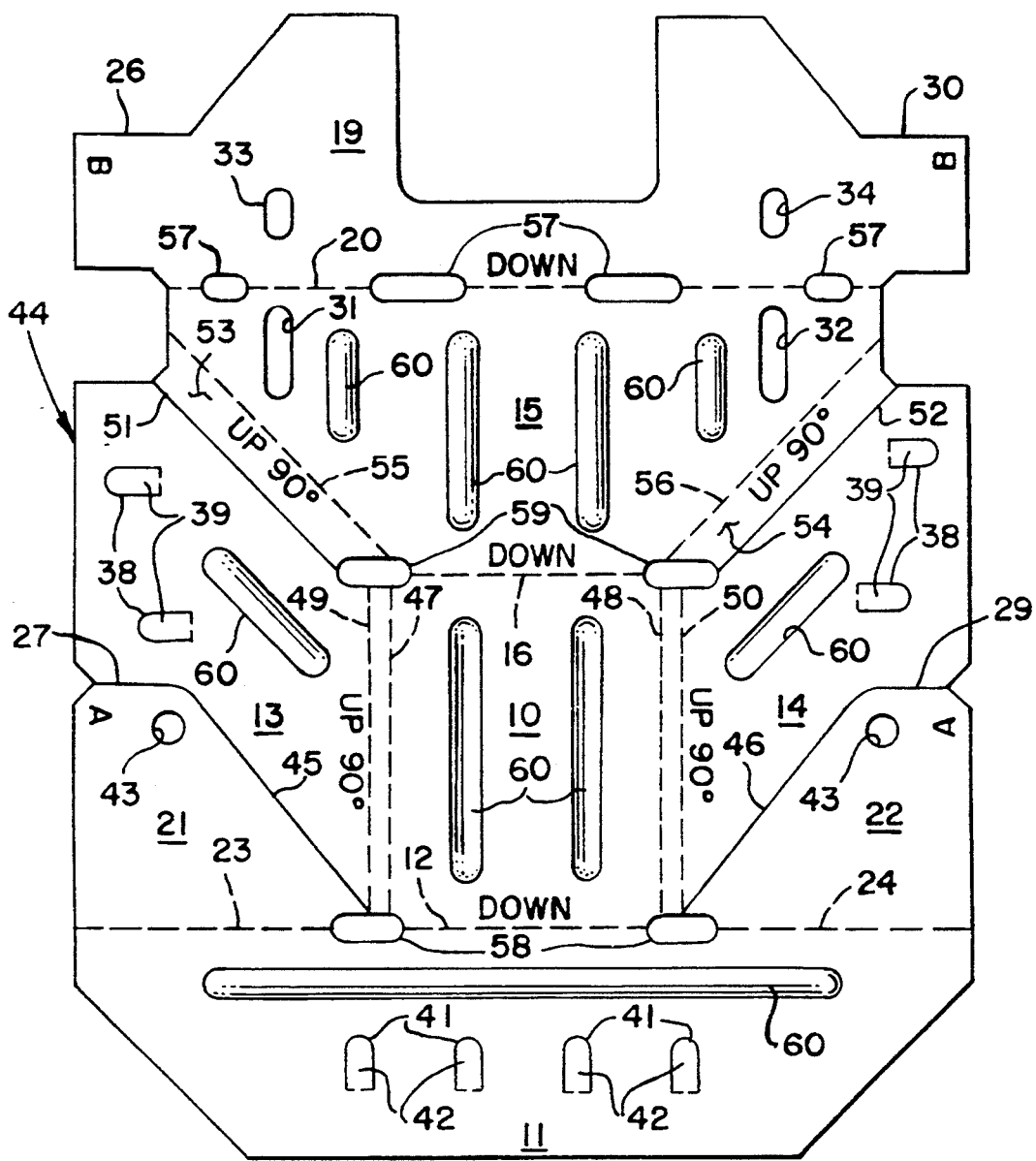
FIG. 8 is a top plan view of the sheet metal blank from which the variable pitch connector of the present invention is constructed.
Figure 7:
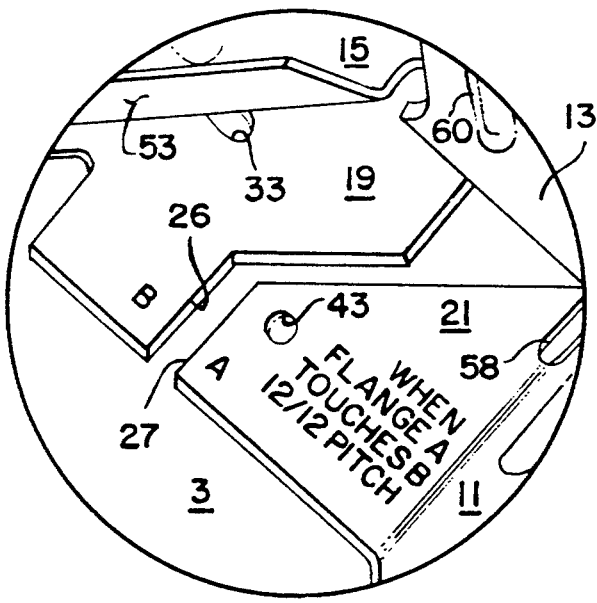
FIG. 7 is a magnified view of a portion of the variable pitch connector illustrated in FIG. 1 taken with the curved line 7—7.

Construction of the variable pitch connector 9 is by cutting a sheet metal blank 44 as illustrated in FIG. 8 from 18 gauge metal as follows; but not necessarily in the following order. First and second fixed base extension members 21 and 22 are bent down 90° along first and second bend lines 23 and 24 and rafter seat 10 is bent down 45° along fixed base bend line 12. To form first and second side members 13 and 14 a cut is made along cut lines 45 and 46, cut lines coincident with inner facing edges 27 and 29, and cut lines 51 and 52. First and second side members 13 and 14 are then bent up 90° along either bend lines 47 and 48 or bend lines 49 and 50 depending upon the width of the rafter seat that is desired.

Adjustable base member 15 is then bent down 112° along rafter seat bend line 16 and adjustable base extension member 19 is bent down 123° along a bend line coincident with lower end 20. To stiffen adjustable base member 15, flanges 53 and 54 are bent up 90° along bend lines 55 and 56.

To make it easier to field bend along the bend line coincident with lower end 20, obround openings 57 are punched out along lower end 20. In like manner, to make it easier to bend rafter seat 10 along fixed base bend line 12 and rafter seat bend line 16, obround openings 58 and 59 are punched in the sheet metal. Finally, indents 60 are formed in the sheet metal at strategic locations to provide stiffening of the various elements.

An example variable pitch connector 9 may have a fixed base member 11 with a width of 5¼", a height of 1 15/16", a fixed base extension member with a width of 1⅞", and first and second side members 13 and 14 with a height of 2¾" disposed 1 19/16" apart.

In operation, one method of constructing the rafter to plate connection 1 is to select the position along wood top plate 2 where the wood rafter 5 is to be connected, then attach variable pitch connector 9. plate edge fasteners 17 may be driven through slotted openings 41 in fixed base member 11 at an angle as illustrated in FIG. 4. First and second fixed base extension members 21 and 22 are then attached to wood top plate 2 by driving second top plate fastener means 25 through openings 43. It is to be understood that all fastener means are preferably either nails or wood screws. Rafter seat 10 is bent down along fixed-base bend line 12, and adjustable base member 15 is bent down along rafter seat bend line 16 as adjustable base extension member 19 is moved along upper surface 2 of wood top plate 2 until the selected rafter pitch is made. When the selected rafter angle is reached, first top plate fastener means 18 is driven through laterally displaced slotted openings 31 and 32 into wood top plate 2. Wood rafter 5 is then placed on rafter seat 10 and rafter fastener means 35 are driven through slotted openings 38 at an angle to the first side surface 7 of wood rafter 5.

I claim:

1. A rafter to plate connection comprising:
   a. a wood top plate having an upper surface and an outside edge surface;
   b. a wood rafter having a bottom surface and first and second side surfaces and;
   c. a variable pitch connector including:
      1) a rafter seat dimensioned to receive a portion of said bottom surface of said wood rafter,
      2) a fixed base member joined to said rafter seat along a fixed base bend line, and dimensioned and positioned in registration with a portion of said outside edge surface of said wood top plate,
      3) first and second side members joined to said rafter seat and dimensioned for registration with said first and second side surfaces of said wood rafter,
      4) an adjustable base member joined to said rafter seat along a rafter seat bend line and having a lower end in contact with said upper surface of said wood top plate;
   d. plate edge fastener means inserted through and connecting said fixed base member to said outside edge surface of said wood top plate;
   e. First top plate fastener means connecting said adjustable base member to said upper surface of said wood top plate;
   f. rafter fastener means connecting said wood rafter respectively to said side members;
   g. First and second fixed base extension members joined to said fixed base member along bend lines; and
   h. second top plate fastener means connecting said first and second fixed base extension members to said upper surface of said wood top plate.

2. A rafter to plate connection comprising:
   a. a wood top plate having an upper surface and an outside edge surface;
   b. a wood rafter having a bottom surface and first and second side surfaces and;
   c. a variable pitch connector including:
      1) a rafter seat dimensioned to receive a portion of said bottom surface of said wood rafter,
      2) a fixed base member joined to said rafter seat along a fixed base bend line, and dimensioned and positioned in registration with a portion of said outside edge surface of said wood top plate,
      3) first and second side members joined to said rafter seat and dimensioned for registration with said first and second side surfaces of said wood rafter,
      4) an adjustable base member joined to said rafter seat along a rafter seat bend line and having a lower end in contact with said upper surface of said wood top plate;
   d. plate edge fastener means inserted through and connecting said fixed base member to said outside edge surface of said wood top plate;
   e. first top plate fastener means connecting said adjustable base member to said upper surface of said wood top plate;
   f. rafter fastener means connecting said wood rafter respectively to said side member;
   g. an adjustable base extension member joined to said adjustable base member along said lower end and formed with an outer facing edge; and
   h. a fixed base extension member joined to said fixed base member and having an inner facing edge dimensioned and located to register with said outer facing edge of said adjustable base extension member at a selected pitch of said wood rafter.

3. A rafter to plate connection comprising:
   a. a wood top plate having an upper surface and an outside edge surface;
   b. a wood rafter having a bottom surface and first and second side surfaces and;
   c. a variable pitch connector including:
      1) a rafter seat dimensioned to receive a portion of said bottom surface of said wood rafter,
      2) a fixed base member joined to said rafter seat along a fixed base bend line, and dimensioned and positioned in registration with a portion of said outside edge surface of said wood top plate,
      3) first and second side members joined to said rafter seat and dimensioned for registration with said first and second side surfaces of said wood rafter,
      4) an adjustable base member joined to said rafter seat along a rafter seat bend line and having a lower end in contact with said upper surface of said wood top plate;
   d. plate edge fastener means inserted through and connecting said fixed base member to said outside edge surface of said wood top plate;
   e. First top plate fastener means connecting said adjustable base member to said upper surface of said wood top plate;
   f. rafter fastener means connecting said wood rafter respectively to said side member
   said wood top plate is formed with an inner edge; and
   h. said adjustable base member is dimensioned so that said lower end of said adjustable base member is in alignment with said inner edge of said wood top plate at a selected pitch of said wood rafter.

4. A rafter to plate connection comprising:

a. a wood top plate having an upper surface and an outside edge surface;
b. a wood rafter having a bottom surface and first and second side surfaces;
c. a variable pitch connector including:
   1) a rafter seat dimensioned to receive a portion of said bottom surface of said wood rafter,
   2) a fixed base member joined to said rafter seat along a fixed base a bend line, and dimensioned and positioned in registration with a portion of said outside edge surface of said wood top plate,
   3) first and second side members joined to said rafter seat and dimensioned for registration with said first and second side surfaces of said wood rafter,
   4) an adjustable base member joined to said rafter seat along rafter seat bend line and having a lower end in contact with said upper surface of said wood top plate,
   4) an adjustable base extension member formed with a first outer facing edge and a second outer facing edge and joined to said adjustable base member along said lower end wherein said joinder forms a bend line coincident with said lower end; and
   6) first and second fixed base extension members joined to said fixed base member along first and second bend lines and having first and second inner facing edges located respectively to selectively register with said first and second outer facing edges of said adjustable base extension member at a selected pitch of said wood rafter;
d. plate edge fastener means connecting said fixed base member to said outside edge surface of said wood top plate;
e. first top plate fastener means connecting said adjustable base member to said upper surface of said wood top plate;
f. second top plate fastener means connecting said first and second fixed base extension members to said upper surface of said wood top plate;
g. rafter fastener means connecting said wood after respectively to said first and second side members; and
h. said variable pitch connector being field bendable along rafter seat bend line and said bend line coincident with said lower end of said adjustable base member for infinite slope adjustment of said rafter between selected slope pitches between about 3 in 12 and 12 in 12 pitch.

5. A rafter to plate connection comprising:
a. wood top plate having an upper surface and an outside edge surface;
b. a wood rafter having a bottom surface and first and second side surfaces;
c. a variable pitch connector including:
   1) a rafter seat dimensioned to receive a portion of said bottom surface of said wood rafter,
   2) a fixed base member joined to said rafter seat along a fixed base bend line, and dimensioned and positioned in registration with a portion of said outside edge surface of said wood top plate,
   3) first and second side members joined to said rafter seat and dimensioned for registration with said first and second side surfaces of said wood rafter,
   4) an adjustable base member joined to said rafter seat along rafter seat bend line and having a lower end in contact with said upper surface of said wood top plate,
   5) an adjustable base extension member formed with a first outer facing edge and a second outer facing edge and joined to said adjustable base member along said lower end wherein said joinder forms a bend line coincident with said lower end; and
   6) first and second fixed base extension members joined to said fixed base member along first and second bend lines and having first and second inner facing edges located respectively to selectively register with said first and second outer facing edges of said adjustable base extension member at a selected pitch of said wood rafter;
d. plate edge fastener means connecting said fixed base member to said outside edge surface of said wood top plate;
e. first top plate fastener means connecting said adjustable base member to said upper surface of said wood top plate;
f. second top plate fastener means connecting said first and second fixed base extension members to said upper surface of said wood top plate;
g. rafter fastener means connecting said wood rafter respectively to said first and second side members;
h. said variable pitch connector being field bendable along rafter seat bend line and said bend line coincident with said lower end of said adjustable base member for infinite slope adjustment of said rafter between selected slope pitches between about 3 in 12 and 12 in 12 pitch;
i. said adjustable base member is formed with laterally displaced slotted openings;
j. said adjustable base extension member is formed with slotted openings for registration with said laterally displaced slotted openings in said adjustable base member for all selected slope pitches of said wood rafter; and
k. said first top plate fastener means are driven respectively through said laterally displaced slotted openings in said adjustable base member, through said slotted openings in said adjustable base extension member and into said upper surface of said wood top plate member at an angle to said upper surface.

* * * * *

UNITED STATES PATENT AND TRADEMARK OFFICE
CERTIFICATE OF CORRECTION

PATENT NO. : 5,335,469
DATED : August 9, 1994
INVENTOR(S) : Todd W. Stuart

It is certified that error appears in the above-identified patent and that said Letters Patent is hereby corrected as shown below:

```
Column 3, line 24, after the words "base member 11 along"
          add   ---first---
Column 3, line 24, after the words "bend line 23" delete "first"
Column 6, line 62, after the words "respectively to said side"
          change "member" to ---members---
Column 6, line 63, before the words "said wood top plate is"
          add ---g.---
Column 7, line 21, before the words "an adjustable base extension"
          delete "4)" and add ---5)---
Column 7, line 44, after the words "means connecting said wood"
          delete "after" add ---rafter---
```

Signed and Sealed this

Eleventh Day of October, 1994

Attest:

BRUCE LEHMAN

Attesting Officer

Commissioner of Patents and Trademarks